United States Patent
Erhart et al.

(10) Patent No.: US 8,416,944 B2
(45) Date of Patent: Apr. 9, 2013

(54) SERVICING CALLS IN CALL CENTERS BASED ON CALLER GEO-LOCATION (75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 652 days.

(21) Appl. No.: 12/490,247

(22) Filed: Jun. 23, 2009

(65) Prior Publication Data
US 2010/0322407 A1 Dec. 23, 2010

(51) Int. Cl.
H04M 3/00 (2006.01)

(52) U.S. Cl.
USPC ............. 379/266.01; 379/265.01; 379/265.02

(58) Field of Classification Search .......... 379/265.01–265.02, 266.01
See application file for complete search history.

(56) References Cited

U.S. PATENT DOCUMENTS

| | | |
|---|---|---|
| 5,873,095 A | 2/1999 | Gore |
| 6,510,380 B1 | 1/2003 | Curatolo et al. |
| 7,283,846 B2 | 10/2007 | Spriestersbach et al. |
| 7,486,943 B2 | 2/2009 | Choti et al. |
| 7,929,954 B2 | 4/2011 | Choti et al. |
| 8,103,250 B2 | 1/2012 | Sullivan et al. |
| 2003/0130893 A1 | 7/2003 | Farmer |
| 2004/0019542 A1 | 1/2004 | Fuchs et al. |
| 2004/0078209 A1 | 4/2004 | Thomson |
| 2004/0082296 A1 | 4/2004 | Twitchell |
| 2005/0195960 A1* | 9/2005 | Shaffer et al. ............ 379/265.02 |
| 2005/0220288 A1* | 10/2005 | Huey ........................ 379/265.02 |
| 2005/0234771 A1 | 10/2005 | Register et al. |
| 2007/0027806 A1 | 2/2007 | Sands et al. |
| 2007/0174390 A1 | 7/2007 | Silvain et al. |
| 2007/0264974 A1 | 11/2007 | Frank et al. |
| 2008/0037763 A1 | 2/2008 | Shaffer et al. |
| 2009/0165092 A1 | 6/2009 | McNamara |
| 2009/0239667 A1 | 9/2009 | Rowe et al. |
| 2009/0271270 A1 | 10/2009 | Regmi et al. |

(Continued)

FOREIGN PATENT DOCUMENTS

EP 2026612 A1 2/2009

OTHER PUBLICATIONS

Punte, Guus, "EP Application No. 10166924.0 Extended European Search Report Sep. 10, 2010,", Publisher: EPO, Published in: EP.
Official Action for U.S. Appl. No. 12/713,512, mailed Dec. 27, 2011, 16 pages.

(Continued)

*Primary Examiner* — Rasha Al Aubaidi
(74) *Attorney, Agent, or Firm* — Sheridan Ross P.C.

(57) ABSTRACT

Methods are disclosed for servicing incoming calls at a call center based on one or more of the following: the geo-locations of the calling telecommunications terminals; the direction of movement of the calling telecommunications terminals (e.g., north, south, toward a particular geo-location or area, away from a particular geo-location or area, etc.); the speed of movement of the calling telecommunications terminals; and the local time at the calling telecommunications terminal. For example, in accordance with the illustrative embodiments, a person who calls the Home Depot® call center from his or her cell phone while in a Home Depot® store might be given priority over another call that was received earlier but was not placed from a Home Depot® store.

21 Claims, 8 Drawing Sheets

U.S. PATENT DOCUMENTS

| | | |
|---|---|---|
| 2010/0077484 A1 | 3/2010 | Paretti et al. |
| 2010/0130213 A1* | 5/2010 | Vendrow et al. ............. 455/445 |
| 2010/0153171 A1 | 6/2010 | Erhart et al. |
| 2010/0235218 A1 | 9/2010 | Erhart et al. |
| 2011/0051658 A1* | 3/2011 | Jin et al. ........................ 370/328 |
| 2011/0196714 A1 | 8/2011 | Erhart et al. |
| 2011/0196724 A1 | 8/2011 | Fenton et al. |
| 2011/0215902 A1 | 9/2011 | Brown, III et al. |
| 2011/0252456 A1 | 10/2011 | Hatakeyama |
| 2012/0058784 A1 | 3/2012 | Niemenmaa et al. |

OTHER PUBLICATIONS

Final Official Action for U.S. Appl. No. 12/713,512, mailed Jun. 18, 2012, 23 pages.

Official Action for U.S. Appl. No. 12/702,764, mailed Aug. 9, 2012, 13 pages.

Official Action for U.S. Appl. No. 12/784,369, mailed Oct. 4, 2012, 11 pages.

* cited by examiner

SERVICING CALLS IN CALL CENTERS BASED ON CALLER GEO-LOCATION

FIELD OF THE INVENTION

The present invention relates to call centers in general, and, more particularly, to servicing calls based on caller geo-location.

BACKGROUND OF THE INVENTION

A call center is a facility where telephone calls are handled by human operators known as agents, usually with some amount of computer automation. Typically, a call center has the ability to handle a considerable volume of calls, providing functions such as routing calls to agents, logging calls, recording calls, and so forth. Call centers are used by many mail-order catalog organizations, telemarketing companies, computer product help desks, government agencies, and large enterprises.

Typically, when a call is received at a call center, the call is automatically routed to an agent who is not currently engaged in a conversation with another caller. If all agents are busy, typically the call is inserted into a queue and the caller is placed "on hold." Callers on hold are typically played a message such as the following: "All agents are currently assisting other customers. Please stay on the line and the next available agent will take your call. Calls are answered in the order that they are received".

SUMMARY OF THE INVENTION

The present invention provides the ability to service incoming calls at a call center based on one or more of the following:
- the geo-locations of the calling telecommunications terminals;
- the direction of movement of the calling telecommunications terminals (e.g., north, south, toward a particular geo-location or area, away from a particular geo-location or area, etc.);
- the speed of movement of the calling telecommunications terminals; and
- the local time at the telecommunications terminal.

For example, if a person calls the Home Depot® call center from his or her cell phone while in a Home Depot® store, the call might be given priority over another call that was received earlier but that was not placed from a Home Depot® store. As another example, preference might be given to a call to the Home Depot® call center where the geo-location and speed of the calling terminal indicate that the caller is traveling in a car on a road where there is both a Home Depot® store and a Lowe's® store (a competing chain) nearby. As yet another example, on a Tuesday night a call center might give preference to a caller whose local time is 10 pm over another caller whose local time is 7 pm—the theory being that the former caller is more likely to hang up while waiting to be served by an agent.

In accordance with the first illustrative embodiment of the present invention, when a call arrives at a call center, an entry corresponding to the call is inserted into a call queue, where the entry comprises: an indicium of the call, the geo-location at which the call was placed, the direction in which the calling telecommunications terminal was moving when the call was placed, the speed at which the calling telecommunications terminal was moving when the call was placed, the time at the telecommunications terminal when the call was placed, and the time at the call center when the entry is inserted into the call queue. While a caller is waiting to be served by an agent, subsequent geo-locations/directions/speeds of the calling terminal might be added to, or might replace the previous values in, the entry. When an agent becomes available to handle a call, an entry in the queue is selected based on one or more of the data stored in the entry. The selected entry is removed from the queue, and the associated call is routed to the available agent.

In accordance with the second illustrative embodiment of the present invention, when a call arrives at a call center, an entry corresponding to the call is inserted into a call queue, where the entry comprises: an indicium of the call, a priority for the call, and the time at the call center when the entry is inserted into the call queue. The priority for the call is determined based on one or more of the following: the geo-location at which the call was placed, the direction in which the calling telecommunications terminal was moving when the call was placed, the speed at which the calling telecommunications terminal was moving when the call was placed, and the calendrical time at the telecommunications terminal when the call was placed. In the second illustrative embodiment, subsequent geo-locations/directions/speeds of the calling terminal are not provided, and the assigned priority is static. When an agent becomes available to handle a call, the entry in the queue with the highest priority is selected and removed from the queue, and the associated call is routed to the available agent.

The third illustrative embodiment of the present invention is similar to the second illustrative embodiment, with the exception that a priority queue data structure is employed for the call queue. By using the priority queue, the highest-priority call in the queue is immediately available, without any computation required to identify and select it. However, insertion of calls into the priority queue and re-organizing the priority queue after removing the highest-priority call both require O(log N) time, where N is the size of the priority queue.

The fourth illustrative embodiment combines the priority queue approach of the third illustrative embodiment with the dynamic information feature of the first illustrative embodiment. In particular, rather than assigning a static priority to entries in the priority queue, the data of the first illustrative embodiment (i.e., the geo-location at which the call was placed, etc.) is stored in each entry, along with a priority that is based on these data. As in the first illustrative embodiment, while a caller is waiting to be served by an agent, subsequent geo-locations/directions/speeds of the calling terminal might be added to, or might replace the previous values in, the entry, and the priority is updated accordingly.

The first illustrative embodiment comprises: selecting one of a plurality of calls to be serviced at a call center based, at least in part, on a geo-location L of a telecommunications terminal that placed one of said calls.

DETAILED DESCRIPTION

For the purposes of this specification, the term "calendrical time" is defined as indicative of one or more of the following:
 (i) a time (e.g., 16:23:58, etc.),
 (ii) one or more temporal designations (e.g., Tuesday, November, etc.),
 (iii) one or more events (e.g., Thanksgiving, John's birthday, etc.), and
 (iv) a time span (e.g., 8:00-9:00, etc.).

Figure 1:
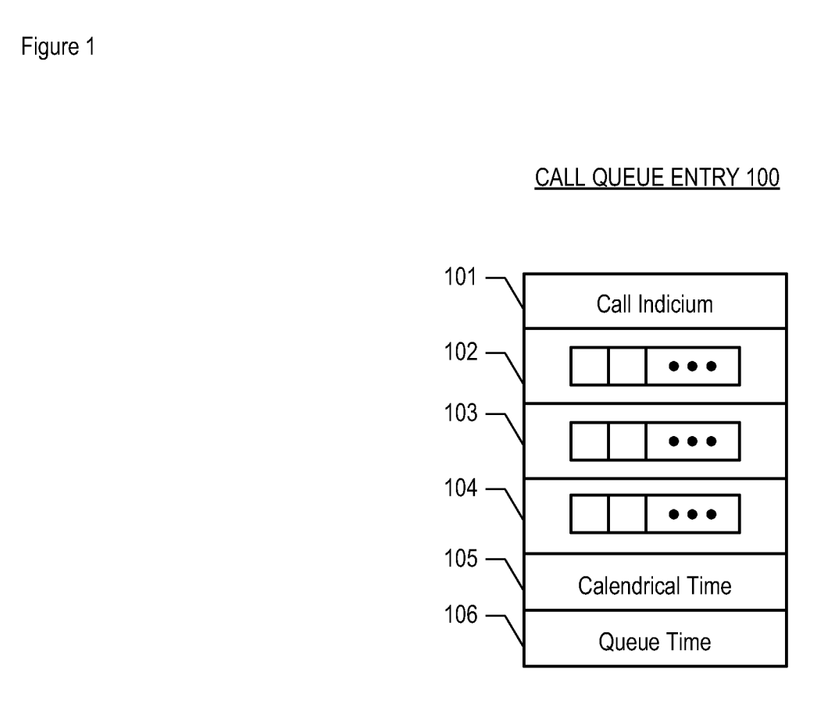
FIG. 1 depicts an illustrative call queue entry, in accordance with the first illustrative embodiment of the present invention.

FIG. 1 depicts illustrative call queue entry 100, in accordance with the first illustrative embodiment of the present invention. As shown in FIG. 1, illustrative call queue entry 100 comprises indicium 101, geo-location list 102, direction list 103, speed list 104, calendrical time 105, and queue time 106.

Indicium 101 is an indicium of an incoming call. As will be appreciated by those skilled in the art, in some embodiments of the present invention indicium 101 might be comprise the actual call-setup signal of the incoming call, while in some other embodiments indicium 101 might contain a pointer or some other type of reference to the call.

Geo-location list 102 comprises one or more geo-locations of the telecommunications terminal that placed the incoming call. In accordance with the first illustrative embodiment, geo-location list 102 comprises the geo-location at which the telecommunications terminal placed the call, and optionally, one or more subsequent geo-locations of the telecommunications terminal after placing the call. As will be appreciated by those skilled in the art, in some alternative embodiments of the present invention, when a subsequent geo-location of the telecommunications terminal is made available, the new geo-location might replace the previously-stored geo-location, rather than being added to the prior geo-location(s) of geo-location list 102, as in the first illustrative embodiment.

In accordance with the first illustrative embodiment, geo-locations are represented as [latitude, longitude, altitude]. As will be appreciated by those skilled in the art, in some other embodiments of the present invention an alternative representation for geo-locations might be employed (e.g., a cell ID of a cellular network, latitude/longitude without an altitude component, 2-dimensional or 3-dimensional Cartesian coordinates, etc.), and it will be clear to those skilled in the art, after reading this disclosure, how to make and use embodiments that employ such representations.

Direction list 103 comprises one or more directions of the telecommunications terminal that placed the incoming call (e.g., north, south, toward a particular geo-location or area, away from a particular geo-location or area, etc.). In accordance with the first illustrative embodiment, direction list 103 comprises the direction in which the calling telecommunications terminal was moving when the call was placed. As will be appreciated by those skilled in the art, in some alternative embodiments of the present invention, when a subsequent direction of the telecommunications terminal is made available, the new direction might replace the previously-stored direction, rather than being added to the prior direction(s) of direction list 103, as in the first illustrative embodiment.

Speed list 104 comprises one or more speeds of the telecommunications terminal that placed the incoming call (e.g., north, south, toward a particular geo-location or area, away from a particular geo-location or area, etc.). In accordance with the first illustrative embodiment, speed list 104 comprises the speed at which the calling telecommunications terminal was moving when the call was placed. As will be appreciated by those skilled in the art, in some alternative embodiments of the present invention, when a subsequent speed of the telecommunications terminal is made available, the new speed might replace the previously-stored speed, rather than being added to the prior speed(s) of speed list 104, as in the first illustrative embodiment.

Calendrical time 105 stores the calendrical time at the telecommunications terminal when the call was placed.

Queue time 106 stores the time at the call center when entry 100 is inserted into the call queue.

Figure 2:
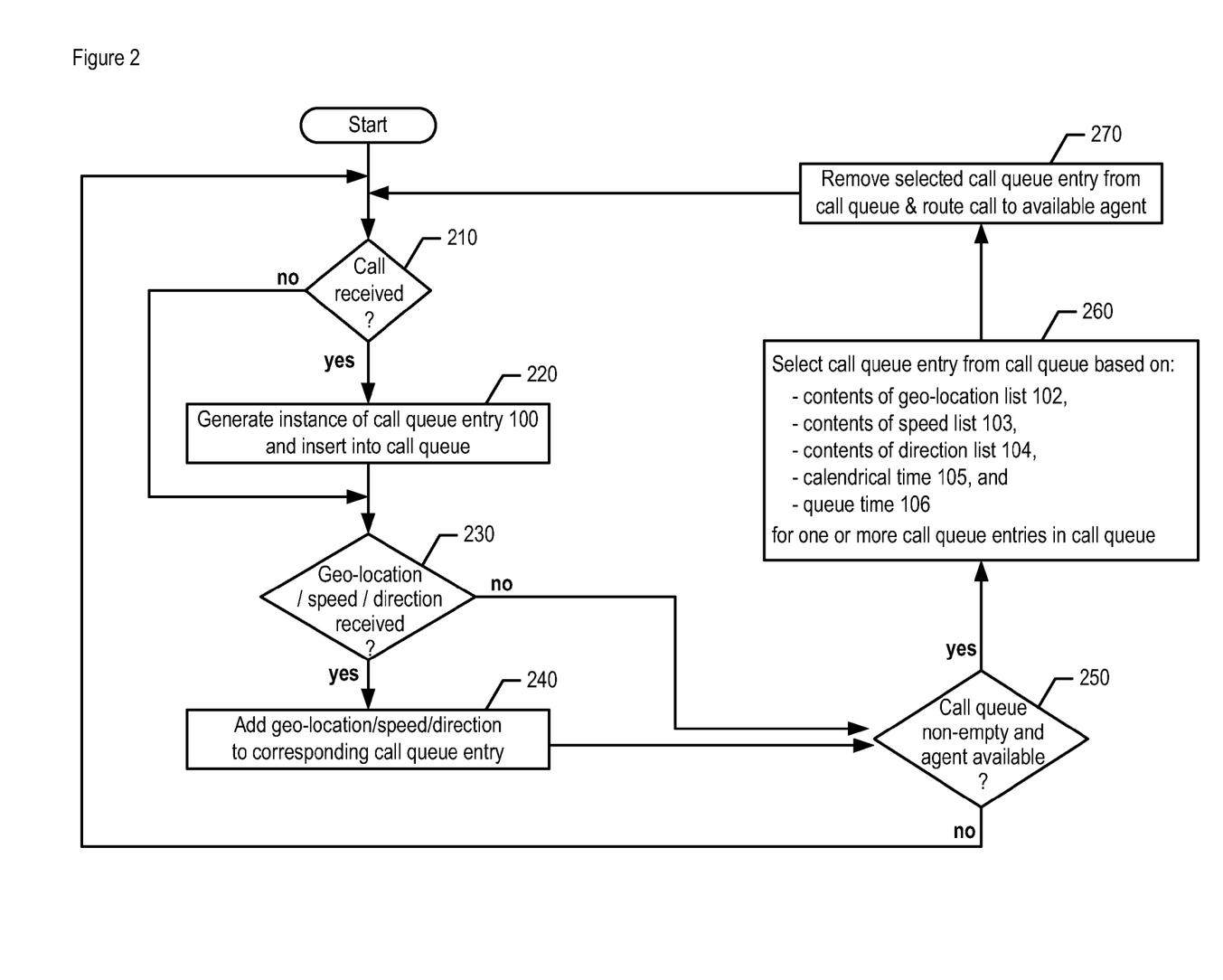
FIG. 2 depicts a flowchart of a method of handling calls at a call center, in accordance with the first illustrative embodiment of the present invention.

FIG. 2 depicts a flowchart of a method of handling calls at a call center, in accordance with the first illustrative embodiment of the present invention. As shown in FIG. 2, the method of FIG. 2 is an event loop. It will be clear to those skilled in the art, after reading this disclosure, which tasks depicted in FIG. 2 can be performed simultaneously or in a different order than that depicted.

Task 210 checks whether an incoming call is received at the call center. If so, execution proceeds to task 220, otherwise execution continues at task 230.

At task 220, an instance of call queue entry 100 corresponding to the incoming call is generated and inserted into a call queue.

Task 230 checks whether a signal is received that indicates a subsequent geo-location and/or speed and/or direction for a telecommunications terminal that is currently waiting to be served by an agent (i.e., a terminal with a corresponding entry in the call queue). If so, execution proceeds to task 240, otherwise execution continues at task 250.

At task 240, the received geo-location/speed/direction is added to geo-location list 102/speed list 103/direction list 104 of the corresponding call queue entry in the call queue. As will be appreciated by those skilled in the art, in some other embodiments of the present invention, these received data might replace, rather than be added to, the prior values.

Task 250 checks whether (i) the call queue is non-empty, and (ii) there is an available agent at the call center to service the call. If so, execution proceeds to task 260, otherwise execution continues back at task 210.

At task 260, a call queue entry from the call queue is selected based on:
 the contents of geo-location list 102;
 the contents of speed list 103;
 the contents of direction list 104;
 calendrical time 105; and
 queue time 106
for one or more call queue entries in the call queue. As will be appreciated by those skilled in the art, the selection at task 260 might be performed in a variety of ways. For example, preference might be given to a call in which the caller is in a Home Depot® store at the time the call was placed, or at any time while waiting in the call queue, with any "ties" broken by favoring a call with an earlier queue time 106. As another example, preference might be given to a call in which the geo-location and speed indicate that the caller is traveling in a car on a road where there is both a Home Depot® store and a Lowe's® store nearby.

At task 270, the call queue entry selected at task 260 is removed from the call queue, and the corresponding call is routed to an available agent, in well-known fashion.

After task 270, execution continues back at task 210.

Figure 3:
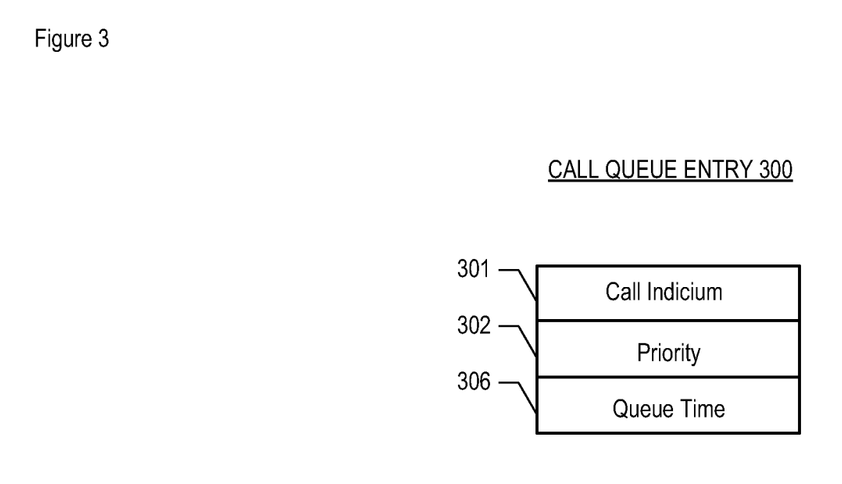
FIG. 3 depicts an illustrative call queue entry, in accordance with the second illustrative embodiment of the present invention.

FIG. 3 depicts illustrative call queue entry 300, in accordance with the second illustrative embodiment of the present invention. As shown in FIG. 3, illustrative call queue entry 300 comprises indicium 301, priority 302, and queue time 306.

Indicium 301, like indicium 101 of the first illustrative embodiment, is an indicium of an incoming call.

Priority 302 indicates the priority of the incoming call, and is based on:
the geo-location at which the call was placed;
the direction in which the calling telecommunications terminal was moving when the call was placed;
the speed at which the calling telecommunications terminal was moving when the call was placed; and
the calendrical time at the telecommunications terminal when the call was placed.
In accordance with the second illustrative embodiment, priority 302 is static (i.e., its value is established when an incoming call is received and does not change afterward.

As will be appreciated by those skilled in the art, in some embodiments of the present invention, priority 302 might be established based on programming logic, while in some other embodiments, priority 302 might be the result of a priority function that operates on the above criteria. As will further be appreciated by those skilled in the art, in some embodiments of the present invention priority 302 might be a numeric value, while in some other embodiments, priority 302 might be some other type of value (e.g., a text string, etc.).

Queue time 306, like queue time 106 of the first illustrative embodiment, stores the time at the call center when entry 300 is inserted into the call queue.

Figure 4:
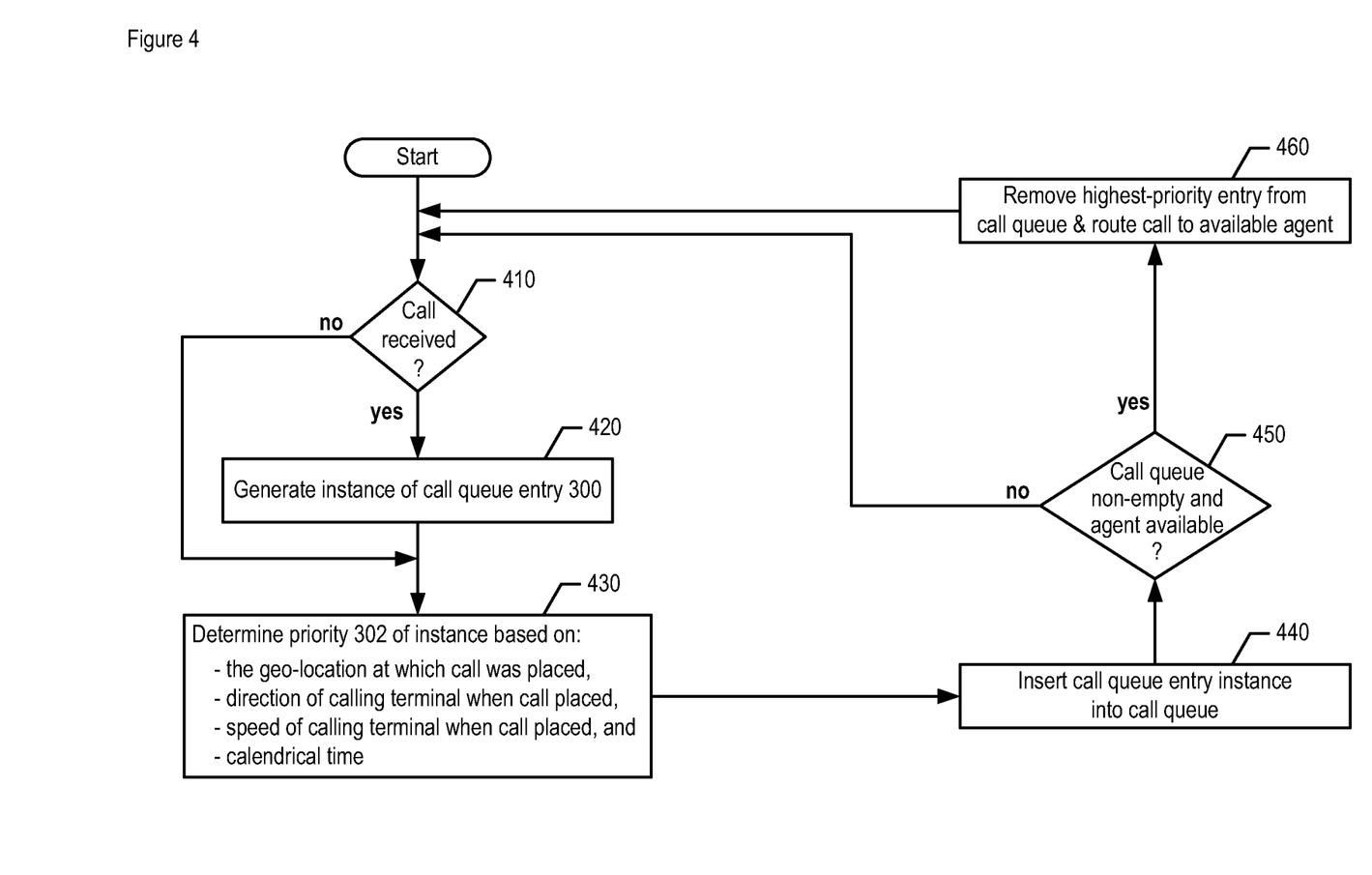
FIG. 4 depicts a flowchart of a method of handling calls at a call center, in accordance with the second illustrative embodiment of the present invention.

FIG. 4 depicts a flowchart of a method of handling calls at a call center, in accordance with the second illustrative embodiment of the present invention. Like the method of FIG. 2, the method of FIG. 4 is an event loop, and it will be clear to those skilled in the art, after reading this disclosure, which tasks depicted in FIG. 4 can be performed simultaneously or in a different order than that depicted.

Task 410 checks whether an incoming call is received at the call center. If so, execution proceeds to task 420, otherwise execution continues at task 430.

At task 420, an instance of call queue entry 300 corresponding to the incoming call is generated.

At task 430, priority 302 of the call queue entry instance is determined based on:
the geo-location at which the call was placed;
the direction in which the calling telecommunications terminal was moving when the call was placed;
the speed at which the calling telecommunications terminal was moving when the call was placed; and
the calendrical time at the telecommunications terminal when the call was placed.

At task 440, the call queue entry instance is inserted into the call queue.

Task 450 checks whether (i) the call queue is non-empty, and (ii) there is an available agent at the call center to service the call. If so, execution proceeds to task 460, otherwise execution continues back at task 410.

At task 460, the call queue entry in the call queue with the highest priority is removed from the call queue, and the corresponding call is routed to an available agent, in well-known fashion.

After task 460, execution continues back at task 410.

Figure 5:
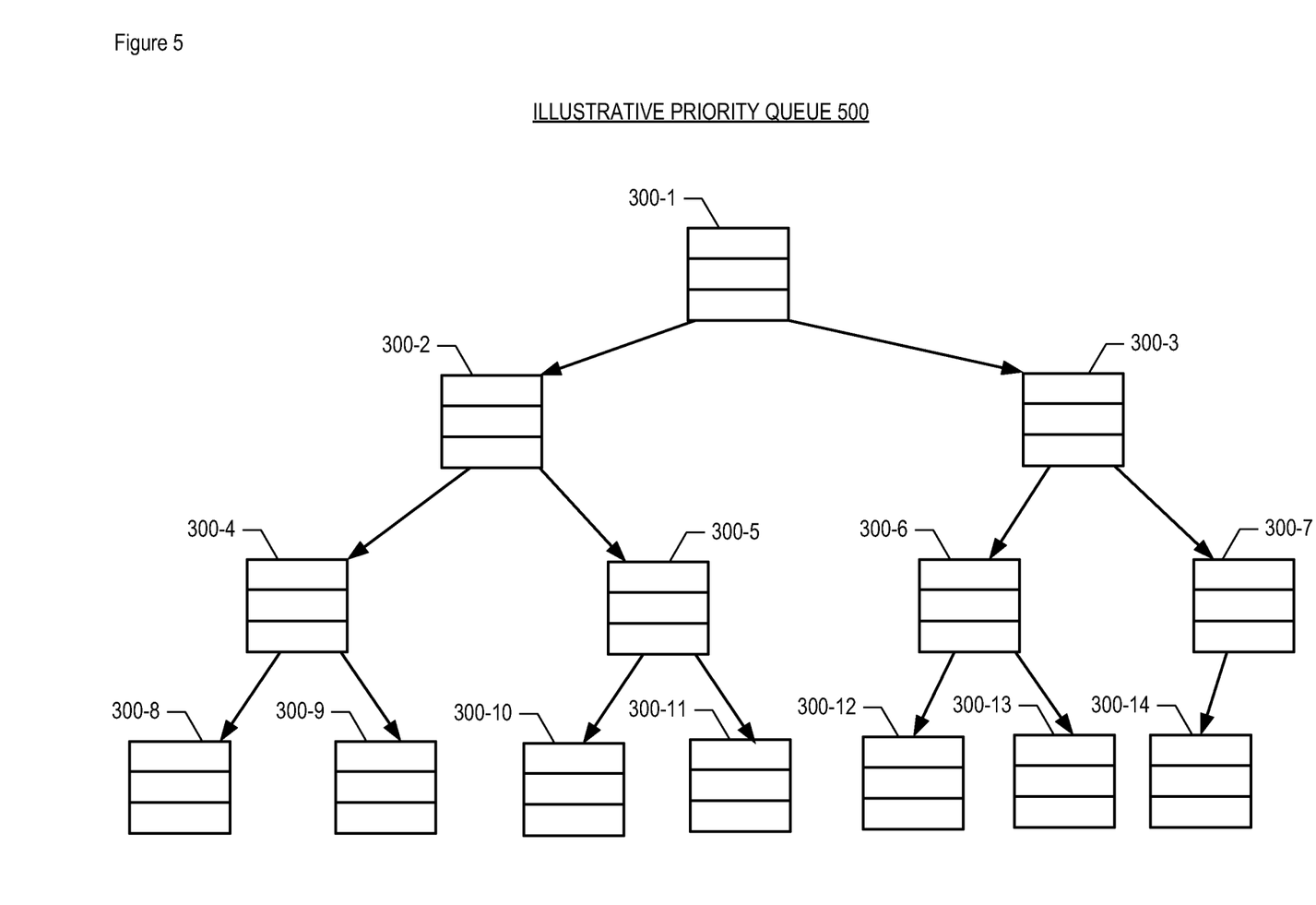
FIG. 5 depicts an illustrative priority queue, in accordance with the third illustrative embodiment of the present invention.

FIG. 5 depicts illustrative priority queue 500, in accordance with the third illustrative embodiment of the present invention. Illustrative priority queue 500 is a partially-ordered binary tree whose nodes are instances of call queue entry 300. In accordance with the partial ordering, for any parent-child pair in the tree, the priority of the parent (as indicated in field 302 of the call queue entry) is at least as high as the priority of the child. Thus, the root of the tree has the highest priority (or is tied for the highest priority) in the entire tree, and finding the highest-priority call queue entry takes constant time. As is well-known in the art, inserting a new call queue entry into the priority queue, and removing a call queue entry from the priority queue, each take O(log N) time, where N is the size of the priority queue. A sequence of N insertions and N deletions therefore takes O(N log N) time, versus O($N^2$) with a totally-ordered queue or an unordered queue.

Figure 6:
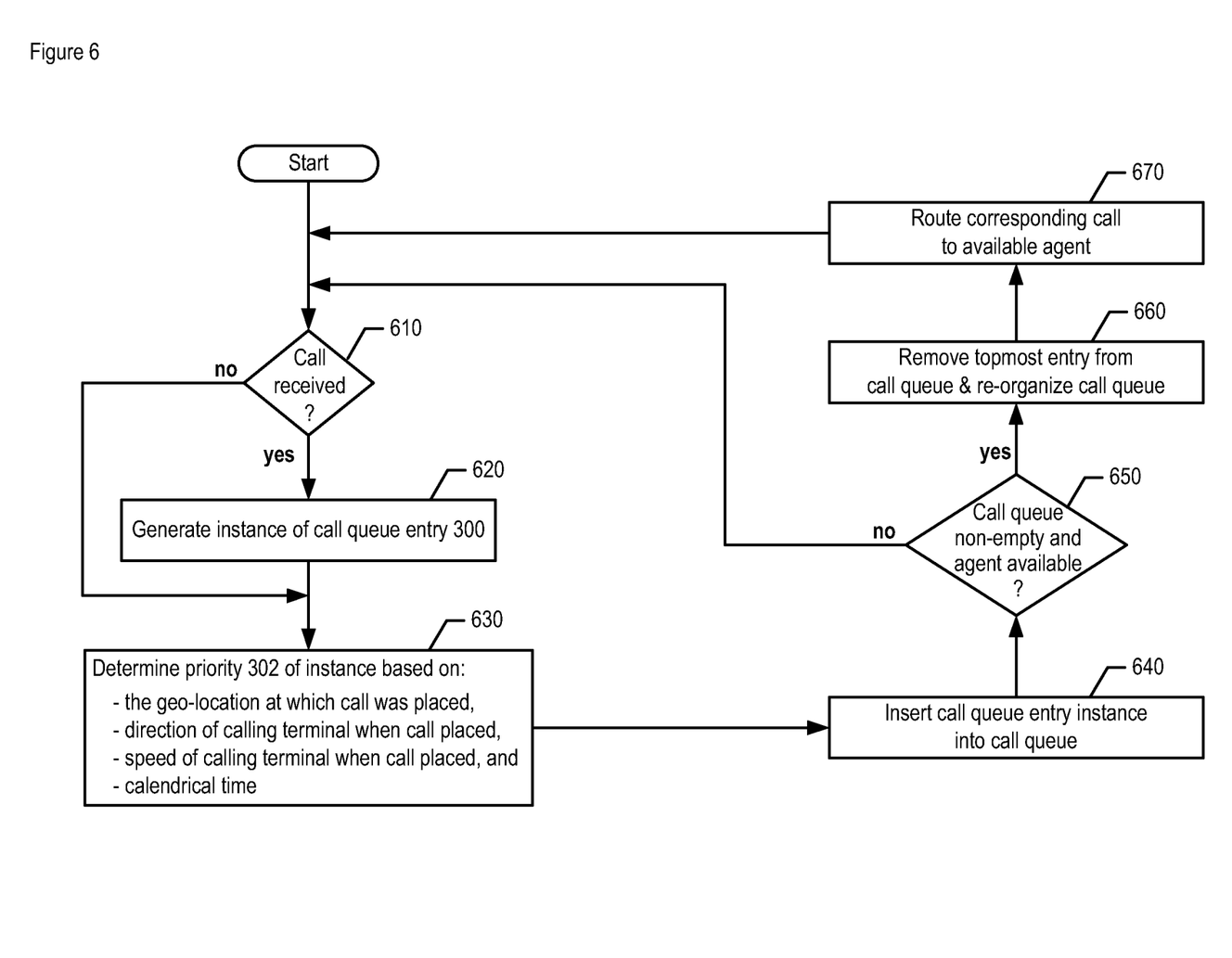
FIG. 6 depicts a flowchart of a method of handling calls at a call center, in accordance with the third illustrative embodiment of the present invention.

FIG. 6 depicts a flowchart of a method of handling calls at a call center, in accordance with the third illustrative embodiment of the present invention. The method of FIG. 6 is similar to the method of FIG. 4, with the exception that the method of FIG. 6 maintains the call queue as a priority queue. It will be clear to those skilled in the art, after reading this disclosure, which tasks depicted in FIG. 6 can be performed simultaneously or in a different order than that depicted.

Task 610 checks whether an incoming call is received at the call center. If so, execution proceeds to task 620, otherwise execution continues at task 630.

At task 620, an instance of call queue entry 300 corresponding to the incoming call is generated.

At task 630, priority 302 of the call queue entry instance is determined based on:
the geo-location at which the call was placed;
the direction in which the calling telecommunications terminal was moving when the call was placed;
the speed at which the calling telecommunications terminal was moving when the call was placed; and
the calendrical time at the telecommunications terminal when the call was placed.

At task 640, the call queue entry instance is inserted into the call queue. As the call queue is maintained as a priority queue, the insertion requires O(log N) time, where N is the size of the queue.

Task 650 checks whether (i) the call queue is non-empty, and (ii) there is an available agent at the call center to service the call. If so, execution proceeds to task 660, otherwise execution continues back at task 610.

At task 660, the topmost call queue entry in the call queue—which has the highest priority—is removed from the call queue, and the call queue is re-organized to maintain the partial ordering, which requires O(log N) time.

At task 670, the call corresponding to the entry removed at task 660 is routed to an available agent, in well-known fashion.

After task 670, execution continues back at task 610.

Figure 7:
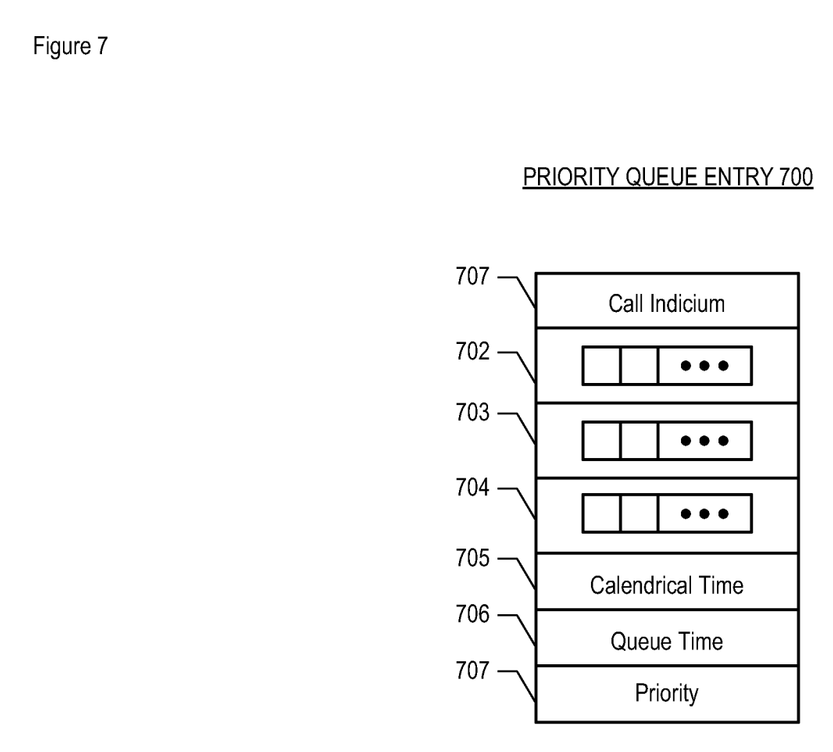
FIG. 7 depicts an illustrative priority queue entry, in accordance with the fourth illustrative embodiment of the present invention.

FIG. 7 depicts illustrative priority queue entry 700, in accordance with the fourth illustrative embodiment of the present invention.

Indicium 701, like indicium 101 of the first illustrative embodiment, is an indicium of an incoming call.

Geo-location list 702, like geo-location list 102 of the first illustrative embodiment, comprises one or more geo-locations of the telecommunications terminal that placed the incoming call. In accordance with the fourth illustrative embodiment, geo-location list 702 comprises the geo-location at which the telecommunications terminal placed the call, and optionally, one or more subsequent geo-locations of the telecommunications terminal after placing the call. As will be appreciated by those skilled in the art, in some alternative embodiments of the present invention, when a subsequent geo-location of the telecommunications terminal is made available, the new geo-location might replace the previously-stored geo-location, rather than being added to the prior geo-location(s) of geo-location list 702, as in the fourth illustrative embodiment.

In accordance with the fourth illustrative embodiment, geo-locations are represented as [latitude, longitude, altitude]. As will be appreciated by those skilled in the art, in some other embodiments of the present invention an alternative representation for geo-locations might be employed (e.g., a cell ID of a cellular network, latitude/longitude without an altitude component, 2-dimensional or 3-dimensional Cartesian coordinates, etc.), and it will be clear to those skilled in the art, after reading this disclosure, how to make and use embodiments that employ such representations.

Direction list 703, like direction list 103 of the first illustrative embodiment, comprises one or more directions of the telecommunications terminal that placed the incoming call (e.g., north, south, toward a particular geo-location or area, away from a particular geo-location or area, etc.). In accordance with the fourth illustrative embodiment, direction list 703 comprises the direction in which the calling telecommunications terminal was moving when the call was placed. As will be appreciated by those skilled in the art, in some alternative embodiments of the present invention, when a subsequent direction of the telecommunications terminal is made available, the new direction might replace the previously-stored direction, rather than being added to the prior direction(s) of direction list 703, as in the fourth illustrative embodiment.

Speed list 704, like speed list 104 of the first illustrative embodiment, comprises one or more speeds of the telecommunications terminal that placed the incoming call (e.g., north, south, toward a particular geo-location or area, away from a particular geo-location or area, etc.). In accordance with the illustrative embodiment, speed list 704 comprises the speed at which the calling telecommunications terminal was moving when the call was placed. As will be appreciated by those skilled in the art, in some alternative embodiments of the present invention, when a subsequent speed of the telecommunications terminal is made available, the new speed might replace the previously-stored speed, rather than being added to the prior speed(s) of speed list 704, as in the fourth illustrative embodiment.

Calendrical time 705, like geo-location list 102 of the first illustrative embodiment, stores the calendrical time at the telecommunications terminal when the call was placed.

Queue time 706, like geo-location list 102 of the first illustrative embodiment, stores the time at the call center when entry 700 is inserted into the call queue.

Priority 707 indicates the priority of the incoming call, and is based on:
  the contents of geo-location list 702;
  the contents of speed list 703;
  the contents of direction list 704;
  calendrical time 705; and
  queue time 706.

As described below and with respect to the method of FIG. 8, in accordance with the fourth illustrative embodiment, priority 707 is dynamic, unlike priority 302 of the second illustrative embodiment.

Figure 8:
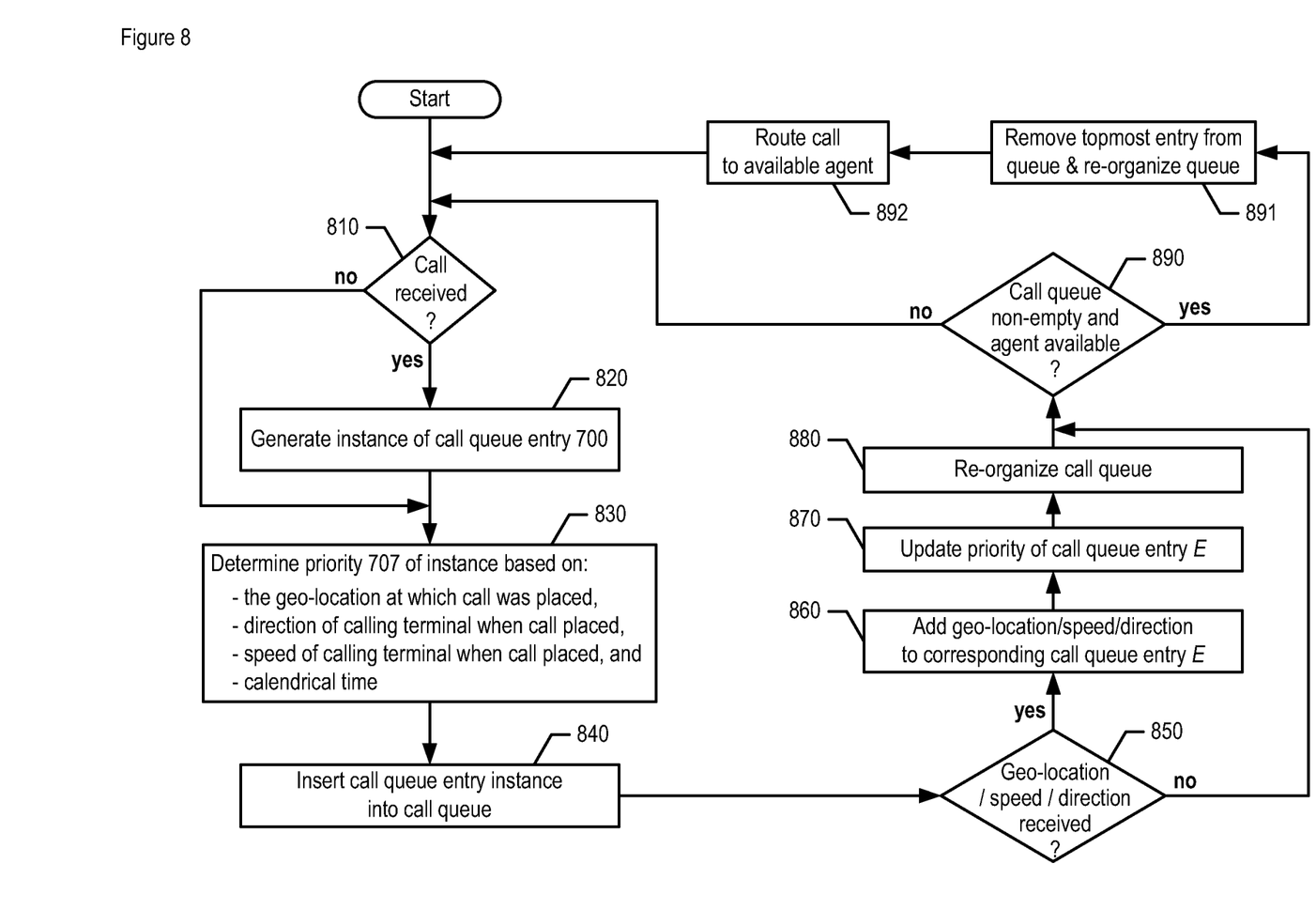
FIG. 8 depicts a flowchart of a method of handling calls at a call center, in accordance with the fourth illustrative embodiment of the present invention.

FIG. 8 depicts a flowchart of a method of handling calls at a call center, in accordance with the fourth illustrative embodiment of the present invention. The method of FIG. 8 combines the dynamic nature of the first illustrative embodiment with the priority queue approach of the third illustrative embodiment. It will be clear to those skilled in the art, after reading this disclosure, which tasks depicted in FIG. 8 can be performed simultaneously or in a different order than that depicted.

Task 810 checks whether an incoming call is received at the call center. If so, execution proceeds to task 820, otherwise execution continues at task 830.

At task 820, an instance of call queue entry 700 corresponding to the incoming call is generated. The call queue entry is instantiated accordingly, except for priority 707, which is handled below at task 830.

At task 830, priority 707 is determined based on the other data of the call queue entry instance, namely:
  the geo-location at which the call was placed;
  the direction in which the calling telecommunications terminal was moving when the call was placed;
  the speed at which the calling telecommunications terminal was moving when the call was placed; and
  the calendrical time at the telecommunications terminal when the call was placed.

At task 840, the call queue entry instance is inserted into the call queue, which is maintained as a priority queue.

Task 850 checks whether a signal is received that indicates a subsequent geo-location and/or speed and/or direction for a telecommunications terminal that is currently waiting to be served by an agent (i.e., a terminal with a corresponding entry in the call queue). If so, execution proceeds to task 860, otherwise execution continues at task 890.

At task 860, the received geo-location/speed/direction is added to geo-location list 702/speed list 703/direction list 704 of the corresponding call queue entry E in the call queue. As will be appreciated by those skilled in the art, in some other embodiments of the present invention, these received data might replace, rather than be added to, the prior values.

At task 870, the priority of call queue entry E is updated, based on the data received at task 860.

At task 880, the call queue is re-organized, if necessary, in order to maintain the partial ordering on the priorities; this re-organization requires O(log N) time in the worst case.

Task 890 checks whether (i) the call queue is non-empty, and (ii) there is an available agent at the call center to service the call. If so, execution proceeds to task 891, otherwise execution continues back at task 810.

At task 891, the topmost call queue entry in the call queue—which has the highest priority—is removed from the call queue, and the call queue is re-organized accordingly.

At task 892, the call corresponding to the entry removed at task 891 is routed to an available agent, in well-known fashion.

After task 892, execution continues back at task 810.

It is to be understood that the disclosure teaches particular examples of the illustrative embodiment and that many variations of the invention can easily be devised by those skilled in the art after reading this disclosure and that the scope of the present invention is to be determined by the following claims.

What is claimed is:

1. A method comprising:
   selecting one call C from among a plurality of calls to be services at a call center, wherein C has a priority, and said priority is based on:
   a geo-location L of telecommunications terminal that placed the call C;
   a direction of movement D of telecommunications terminal; and
   a speed of movement S of the telecommunications terminal, and
   wherein selecting one call C from among the plurality of calls to be services is based on:
   the geo-location L of the telecommunications terminal relative to a geo-location of the call center, the geo-location L of the telecommunications terminal relative to a geo-location associated with the call center, and the geo-location L of the telecommunications terminal relative to a geo-location that lacks an association with the call center.

2. The method of claim 1 wherein L is the geo-location from which said telecommunications terminal placed C.

3. The method of claim 1, wherein selecting one call C from among the plurality of calls to be serviced is further based on the calendrical time at the telecommunications terminal.

4. A method for handling a call at a call center, comprising:
   receiving a call at a call center, the call center including a call queue that corresponds to a plurality of calls to be serviced at the call center;
   generating a call queue entry that is based at least in part upon the call;
   inserting the call queue entry into the call queue;
   receiving call handling information about the telecommunications terminal that placed the call, the call handling information including a geo-location L of the telecommunications terminal and at least one of a direction of movement D of the telecommunications terminal and a speed of movement S of the telecommunications terminal;
   adding the call handling information to the call queue entry;
   selecting the call from the call queue when an agent is available;
   removing the call queue entry from the call queue; and
   routing the call to the available agent;
   wherein selecting the call from the call queue is based at least in part upon the call handling information and a calendrical time at the telecommunications terminal, and
   wherein selecting of the call is further based upon a distance selected from a group of distances consisting of:
   a distance between L and the geo-location of the call center;
   a distance between L and a geo-location associated with the call center; and
   a distance between L and a geo-location that lacks an association with the call center.

5. The method of claim 4, wherein inserting the call queue entry into the call queue is based at least in part upon a priority of the call queue entry determined at the time at which the telecommunications terminal called the call center.

6. The method of claim 4, wherein criteria for selecting the call define a priority for the call queue entry, and further comprising:
   at a time after the telecommunications terminal called the call center, receiving updated information about the telecommunications terminal including an updated geo-location L and at least one of an updated direction of movement D, and an updated speed of movement S;
   updating the priority of the call queue entry based at least in part upon the updated information; and
   reorganizing the call queue before routing the call.

7. The method of claim 4, wherein the criteria for selecting the call define a priority for the call queue entry, and further comprising:
   at approximately a time of selecting, receiving updated information about the telecommunications terminal including an updated geo-location L and at least one of an updated direction of movement D, and an updated speed of movement S;
   updating a priority of the call queue entry based at least in part upon the updated information; and
   reorganizing the call queue before routing the call.

8. The method of claim 4, wherein selecting of the call is further based upon a distance selected from a group of distances consisting of
   a distance between L and the geo-location of the call center;
   a distance between L and a geo-location associated with the call center; and
   a distance between L and a geo-location that lacks an association with the call center.

9. The method of claim 4, wherein the geo-location L is one of a latitude/longitude, latitude/longitude/altitude, 2-dimensional (x,y) Cartesian, and 3-dimensional (x,y,z) Cartesian coordinates of the telecommunications terminal.

10. The method of claim 4 wherein said geo-location L is the geo-location at which said telecommunications terminal called said call center.

11. The method of claim 4 wherein said geo-location L is the geo-location of said telecommunications terminal at a time after said telecommunications terminal called said call center.

12. The method of claim 4 wherein said geo-location L is the geo-location of said telecommunications terminal at approximately the time of the selection.

13. The method of claim 4 wherein the selection is also based on a direction of movement D of said telecommunications terminal.

14. The method of claim 13 wherein said direction of movement D is the direction of said telecommunications terminal when said telecommunications terminal called said call center.

15. The method of claim 13 wherein said direction of movement D is the direction of said telecommunications terminal at a time after said telecommunications terminal called said call center.

16. The method of claim 13 wherein said direction of movement D is the direction of said telecommunications terminal at approximately the time of the selection.

17. The method of claim 4 wherein the selection is also based on a speed S of said telecommunications terminal.

18. The method of claim 17 wherein said speed of movement S is the speed of said telecommunications terminal when said telecommunications terminal called said call center.

19. The method of claim 17 wherein said speed of movement S is the speed of said
   telecommunications terminal at a time after said telecommunications terminal called said call center.

20. The method of claim 17 wherein said speed of movement S is the speed of said telecommunications terminal at approximately the time of the selection.

21. A method for handling a call at a call center, comprising:
- receiving a call at a call center, the call center including a call queue that corresponds to a plurality of calls to be serviced at the call center;
- generating a call queue entry that is based at least in part upon the call;
- inserting the call queue entry into the call queue;
- receiving call handling information about the telecommunications terminal that placed the call, the call handling information including a geo-location L of the telecommunications terminal and at least one of a direction of movement D of the telecommunications terminal and a speed of movement S of the telecommunications terminal;
- adding the call handling information to the call queue entry;
- selecting the call from the call queue when an agent is available;
- removing the call queue entry from the call queue; and
- routing the call to the available agent;
- wherein selecting the call from the call queue is based at least in part upon the call handling information and a calendrical time at the telecommunications terminal;
- wherein selecting the call is further based upon a position of L relative to a first geo-location associated with the call center and a second geo-location that lacks an association with the call center.

* * * * *

UNITED STATES PATENT AND TRADEMARK OFFICE
CERTIFICATE OF CORRECTION

PATENT NO. : 8,416,944 B2
APPLICATION NO. : 12/490247
DATED : April 9, 2013
INVENTOR(S) : George William Erhart et al.

It is certified that error appears in the above-identified patent and that said Letters Patent is hereby corrected as shown below:

In the Claims:

Column 9, line 4 and 13, please delete "services" and insert --serviced--.

Column 9, line 6, please insert --a-- between 'of' and 'telecommunications'.

Column 9, line 8, please insert --the-- between 'of' and 'telecommunications'.

Signed and Sealed this
Twenty-fifth Day of June, 2013

Teresa Stanek Rea
*Acting Director of the United States Patent and Trademark Office*